US012352090B1

(12) United States Patent
Basso et al.

(10) Patent No.: US 12,352,090 B1
(45) Date of Patent: Jul. 8, 2025

(54) WINDOW BALANCE APPARATUS AND METHOD

(71) Applicants: Murilo Rodrigues Basso, Pensacola, FL (US); Anita Nicole Gislason, Pensacola, FL (US); Steven Kyle Pumell, Gulf Breeze, FL (US)

(72) Inventors: Murilo Rodrigues Basso, Pensacola, FL (US); Anita Nicole Gislason, Pensacola, FL (US); Steven Kyle Pumell, Gulf Breeze, FL (US)

( * ) Notice: Subject to any disclaimer, the term of this patent is extended or adjusted under 35 U.S.C. 154(b) by 79 days.

(21) Appl. No.: 18/369,368

(22) Filed: Sep. 18, 2023

Related U.S. Application Data

(60) Provisional application No. 63/408,514, filed on Sep. 21, 2022.

(51) Int. Cl.
*E05F 3/00* (2006.01)
*E05F 1/16* (2006.01)

(52) U.S. Cl.
CPC ..................................... *E05F 1/16* (2013.01)

(58) Field of Classification Search
CPC ... Y10T 16/197; Y10T 16/64; Y10T 16/6298; Y10T 16/65; E05F 1/16; E05D 5/02; E05D 13/08; E05D 13/10; E05D 13/12; E05D 13/1276; E05D 13/1284; E05D 13/1292; E05D 15/22; E05D 15/165; E05Y 2900/148; E05Y 2201/10; E05Y 2201/21; E05Y 2800/45; E06B 3/44; E06B 3/4407; E06B 3/4415; F16F 1/12; F16M 13/02
See application file for complete search history.

(56) References Cited

U.S. PATENT DOCUMENTS 1,208,734 A * 12/1916 Hagen et al. ............. E06B 3/44 292/210
1,974,946 A * 9/1934 Baughman .............. E05C 17/64 292/DIG. 64
2,217,035 A * 10/1940 John ....................... E05F 11/00 292/261
2,353,630 A * 7/1944 Berry ...................... E05D 13/08 49/421
2,442,147 A * 5/1948 Recklitis ................. E05D 13/08 49/418
2,469,464 A * 5/1949 Gratkowski .......... E05D 13/123 49/417
2,614,875 A * 10/1952 Schwartzmann ....... E05C 17/64 49/421
2,984,509 A * 5/1961 Kaufman ................ E05D 13/08 292/342

(Continued)

FOREIGN PATENT DOCUMENTS

AU 3779195 A * 5/1996

*Primary Examiner* — Chuck Y Mah
(74) *Attorney, Agent, or Firm* — J. Nevin Shaffer, Jr.

(57) ABSTRACT

A window balance apparatus and method with a main body configured to movably connect with a window frame and a window sash. A spacer is connected with the main body, the spacer configured to extend from the main body when connected to the main body such that the spacer contacts the window frame. A pressure delivery device is located within the main body and is connected with the spacer and a pressure adjustment device is provided and is configured to adjustably contact the pressure delivery device so as to add or subtract pressure on the spacer.

16 Claims, 6 Drawing Sheets

(56) References Cited

U.S. PATENT DOCUMENTS

| | | | | | |
|---|---|---|---|---|---|
| 4,570,382 | A * | 2/1986 | Suess | E05D 13/08 | 49/431 |
| 5,248,174 | A * | 9/1993 | Matz | E05B 65/0852 | 292/DIG. 47 |
| 5,536,052 | A * | 7/1996 | Maier | E05B 65/0852 | 292/DIG. 47 |
| 5,575,116 | A * | 11/1996 | Carlson | E05C 19/06 | 49/449 |
| 5,632,118 | A * | 5/1997 | Stark | E05D 15/22 | 49/184 |
| 5,784,840 | A * | 7/1998 | Dodson | E05D 13/08 | 52/204.5 |
| 6,854,214 | B2 * | 2/2005 | Polowinczak | E05B 65/0864 | 49/449 |
| 7,600,796 | B2 * | 10/2009 | Liang | E05C 17/60 | 292/DIG. 20 |
| 7,637,544 | B2 * | 12/2009 | Liang | E05C 17/50 | 292/DIG. 31 |
| 2005/0283944 | A1 * | 12/2005 | Wu | E05D 13/1207 | 16/194 |

* cited by examiner

WINDOW BALANCE APPARATUS AND METHOD

CROSS REFERENCE TO RELATED APPLICATION

This application claims the benefit of previously filed U.S. provisional patent application No. 63/408,514 filed Sep. 21, 2022 for a "Window Balance Apparatus and Method". The Applicants hereby claim the benefit of this provisional application under 35 U.S.C. § 119. The entire content of this provisional application is incorporated herein by this reference.

FIELD OF THE DISCLOSURE

The present invention pertains to a window balance apparatus and method and, in a preferred embodiment, to a window balance apparatus consisting of a main body configured to movably connect with a window frame and a window sash. A spacer is connected with the main body, the spacer configured to extend from the main body when connected to the main body such that the spacer contacts the window frame. A pressure delivery device is located within the main body and is connected with the spacer and a pressure adjustment device is provided and is configured to adjustably contact the pressure delivery device so as to add or subtract pressure on the spacer.

BACKGROUND OF THE INVENTION

Window balances are well known in the art and are provided to enable users to effectively position a window sash at any desired location within a window frame and to hold the window sash against movement at the desired location. Window manufacturers offer, for example, a spiral window balance. However, a problem with this prior art device is that the parts rust, dent, bend and easily break. The spiral balance cannot be repaired and it has a shorter life span compared to other balances.

One of the most common types of prior art window balances is a "constant force" window balance that uses a coiled spring to assist in raising the window sash and to keep it in a desired location. The "constant force" window balance rarely malfunctions but a problem with this type and with all of the rest of the prior art window balances is their complexity and multiplicity of parts that can and, eventually do, wear out and break down over time. When this happens, a user is faced with a time consuming and complex task to repair and/or replace the window balance. This difficulty is magnified in as much as there are typically two window balances per window sash, one on each side of the window sash that must be dealt with.

Thus, there is a need in the art for a window balance that addresses the aforementioned problems in a manner that has fewer moving parts and is robust and flexible so as to accommodate a full spectrum of window sash shapes, weights, and dimensions.

It therefore is an object of this invention to provide an improved window balance apparatus and method that is easy to use and economical to install and operate.

SUMMARY

Accordingly, an improved window balance apparatus and method according to a preferred embodiment consists of a main body configured to movably connect with a window frame and a window sash. A spacer is connected with the main body, the spacer configured to extend from the main body when connected to the main body such that the spacer contacts the window frame. A pressure delivery device is located within the main body and is connected with the spacer and a pressure adjustment device is provided and is configured to adjustably contact the pressure delivery device so as to add or subtract pressure on the spacer.

In one aspect, there are more than one spacers connected with the main body.

In another aspect, the pressure delivery device is a spring.

In a further aspect, the pressure adjustment device is a set screw.

In one aspect, the main body is T shaped with a first face overlapping a second face where the first face is configured to movably fit within the window frame such that the main body is movably connected with the window frame and such that the second face is configured to engage the window sash.

In another aspect, the apparatus further includes a window sash capture clip configured to engage the main body so as to connect the window sash with the main body when the main body is connected with the window frame.

In another aspect, the spacer includes a contact face where the contact face angles away from the main body such that more of the contact face contacts the window frame as pressure is added to the spacer and less of the contact face contacts the window frame as pressure is subtracted from the spacer.

In one aspect, the apparatus further includes a window frame with a first side and a second side and two main bodies, with one main body connected with the first side of the window frame and with another main body connected with the second side of the window frame and the window sash connected with both main bodies.

According to another embodiment, a window balance apparatus has a main body configured to connect with a window frame and a window sash. A first spacer and a second spacer are connected with the main body, the first spacer and second spacer configured to extend from the main body when connected to the main body. A center pressure delivery device is located within the main body and between the first spacer and the second spacer and a first pressure delivery device is located on one side of the first spacer, the first pressure delivery device opposite the center pressure delivery device with the first spacer in between and a second pressure delivery device located on one side of the second spacer, the second pressure delivery device opposite the center pressure delivery device with the second spacer in between.

In one aspect, the center pressure delivery device, the first pressure delivery device and the second pressure delivery device is a spring.

In another aspect, the apparatus further includes a first pressure adjustment device and a second pressure adjustment device where the first pressure adjustment device is configured to adjustably contact the first pressure delivery device so as to add or subtract pressure on the first spacer and a second pressure adjustment device where the second pressure adjustment device is configured to adjustably contact the second pressure delivery device so as to add or subtract pressure on the second spacer.

In another aspect, the first pressure delivery device and the second pressure delivery device is a set screw.

In one aspect, the main body is T shaped with a first face overlapping a second face where the first face is configured to movably fit within the window frame such that the main body is movably connected with the window frame and such that the second face is configured to engage the window sash.

In another aspect, the apparatus further includes a window sash capture clip configured to engage the main body so as to connect the window sash with the main body when the main body is connected with the window frame.

In one aspect, the first spacer and the second spacer include a contact face where the contact face angles away from the main body such that more of the contact face contacts the window frame as pressure is added to the spacers and less of the contact face contacts the window frame as pressure is subtracted from the spacers.

In one aspect, the apparatus further includes a window frame with a first side and a second side and two main bodies, with one main body connected with the first side of the window frame and with another main body connected with the second side of the window frame and the window sash connected with both main bodies.

According to another embodiment, a window balance method comprises:

a. providing a main body configured to movably connect with a window frame and a window sash; a spacer connected with the main body, the spacer configured to extend from the main body when connected to the main body such that the spacer contacts the window frame; a pressure delivery device located within the main body and connected with the spacer and a pressure adjustment device configured to adjustably contact the pressure delivery device so as to add or subtract pressure on the spacer and at the point of contact with the window frame; and
b. adjusting the pressure adjustment device so as to apply selected pressure to the spacer.

In one aspect, the main body is T shaped with a first face overlapping a second face where the first face is configured to movably fit within the window frame such that the main body is movably connected with the window frame and such that the second face is configured to engage the window sash.

In another aspect, the method further includes a window sash capture clip configured to engage the main body so as to connect the window sash with the main body when the main body is connected with the window frame.

In one aspect, the pressure delivery device is a spring and the pressure adjustment device is a set screw.

DESCRIPTION OF THE DRAWINGS

Other objects, features and advantages of the present invention will become more fully apparent from the following detailed description of the preferred embodiment, the appended claims and the accompanying drawings in which:

DETAILED DESCRIPTION OF EMBODIMENTS

Figure 1:
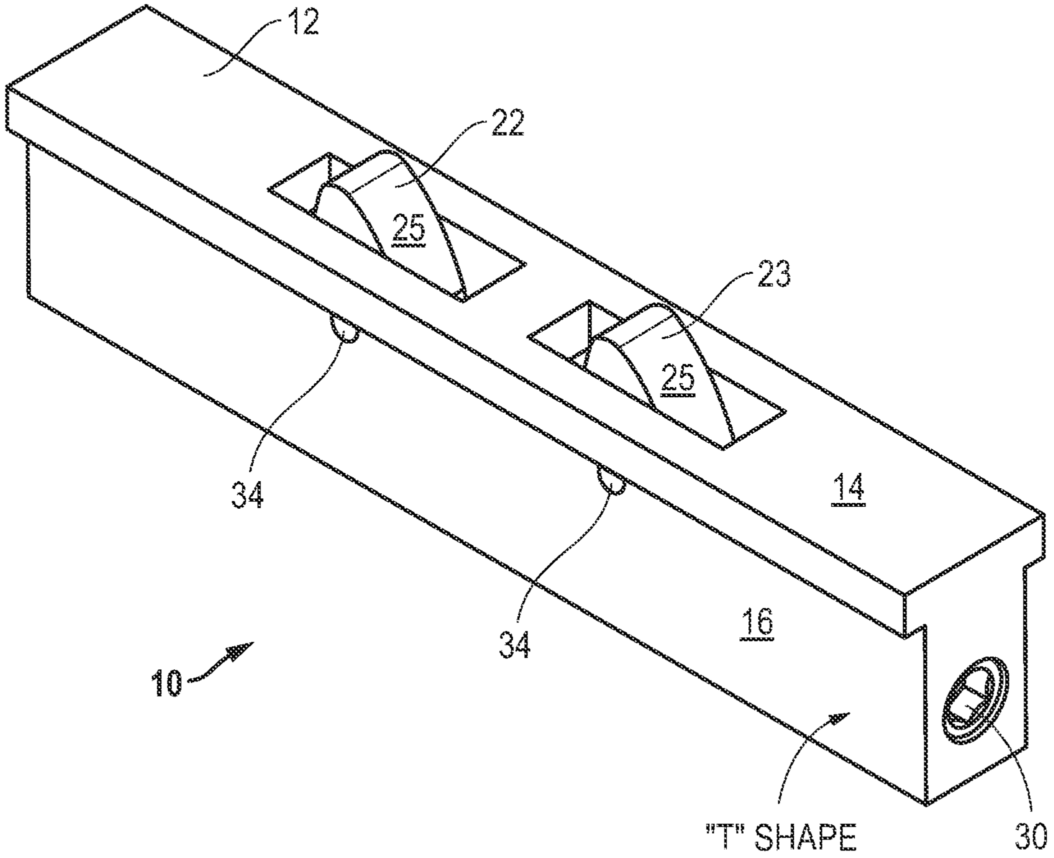
FIG. 1 is a perspective view of the window balance of the present invention according to a preferred embodiment.

Before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the invention be regarded as including equivalent constructions to those described herein insofar as they do not depart from the spirit and scope of the present invention.

For example, the specific sequence of the described method may be altered so that certain processes are conducted in parallel or independent, with other processes, to the extent that the processes are not dependent upon each other. Thus, the specific order of steps described herein is not to be considered implying a specific sequence of steps to perform the process. In alternative embodiments, one or more process steps may be implemented by a user assisted process and/or manually.

In addition, features illustrated or described as part of one embodiment can be used on other embodiments to yield a still further embodiment. Additionally, certain features may be interchanged with similar devices or features not mentioned yet which perform the same or similar functions. It is therefore intended that such modifications and variations are included within the totality of the present invention.

It should also be noted that a plurality of hardware and software based devices, as well as a plurality of different structural components, may be utilized to implement the invention. Furthermore, and as described in subsequent paragraphs, the specific configurations illustrated in the drawings are intended to exemplify embodiments of the invention and that other alternative configurations are possible.

One embodiment of the present invention is illustrated by way of example in FIGS. 1-6. With specific reference to FIGS. 1-3, window balance apparatus and method 10, according to a preferred embodiment, includes a main body 12. Preferably, the main body 12 is "T" shaped, as illustrated by way of example only and not by limitation, with a first face 14 overlapping a second face 16 where the first face 14 is configured to movably fit within a window frame 18 (See FIGS. 4, 5 and 6) such that the main body 12 is movably connected with the window frame 18 by the first face 14 and such that the second face 16 is configured to engage a window sash 20 (See FIGS. 5 and 6) as will be described more fully hereafter.

At least one spacer 22 is connected with the main body, the at least one spacer 22 configured to extend from the main body 12 when connected to the main body 12 as illustrated. Preferably there are two spacers, spacer 22 and spacer 23 as shown. Certainly, more than two spacers may be provided as well.

Also, as shown, Applicants have found that it is preferable that the spacers, 22 and 23, have an angled face 25 that extends from the main body 12 as shown. As will be described more fully hereafter, the angled face 25 of spacers 22 and 23 contact the window frame 18. As more pressure is applied to spacers 22 and 23 more of the angled face 25 contacts the window frame 18. This results in enabling the main body 12 to support a heavier window sash 20.

Figure 2:
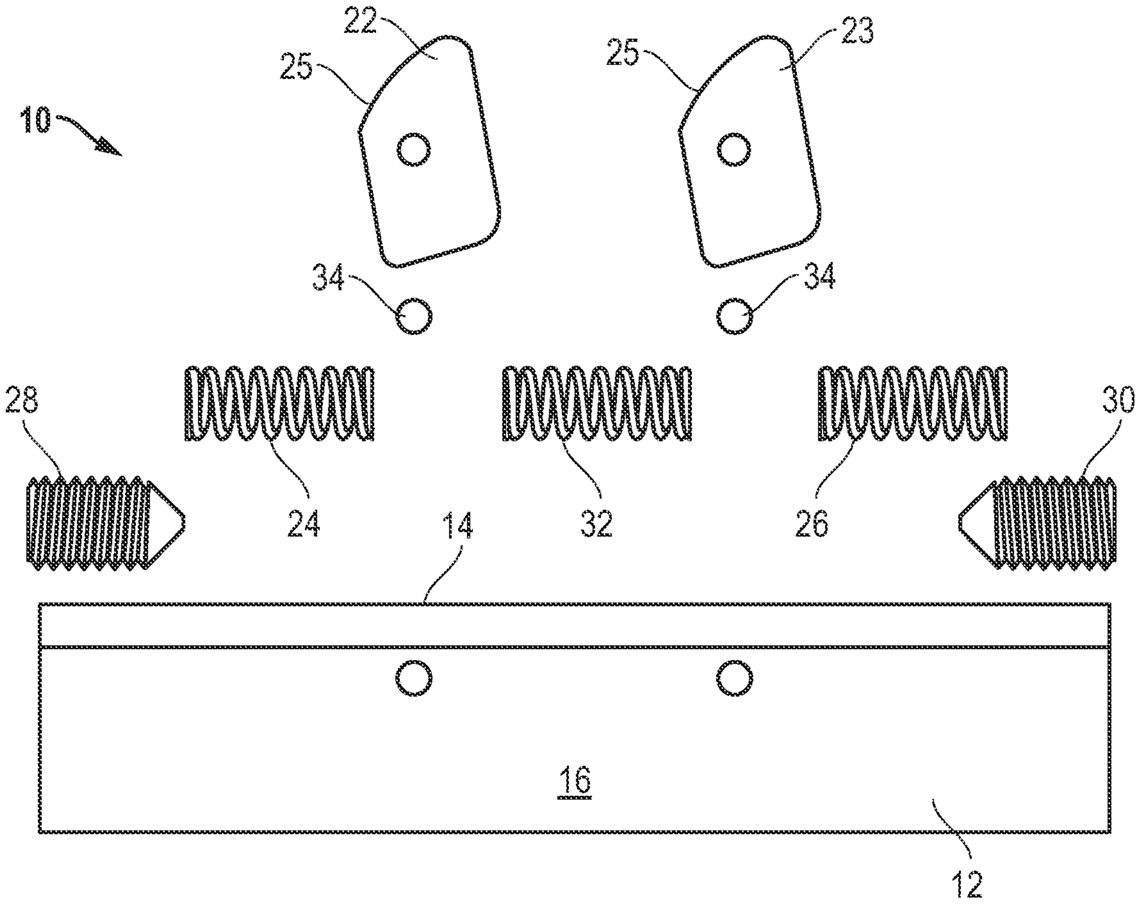
FIG. 2 is a side exploded view of the invention of FIG. 1.
Figure 3:
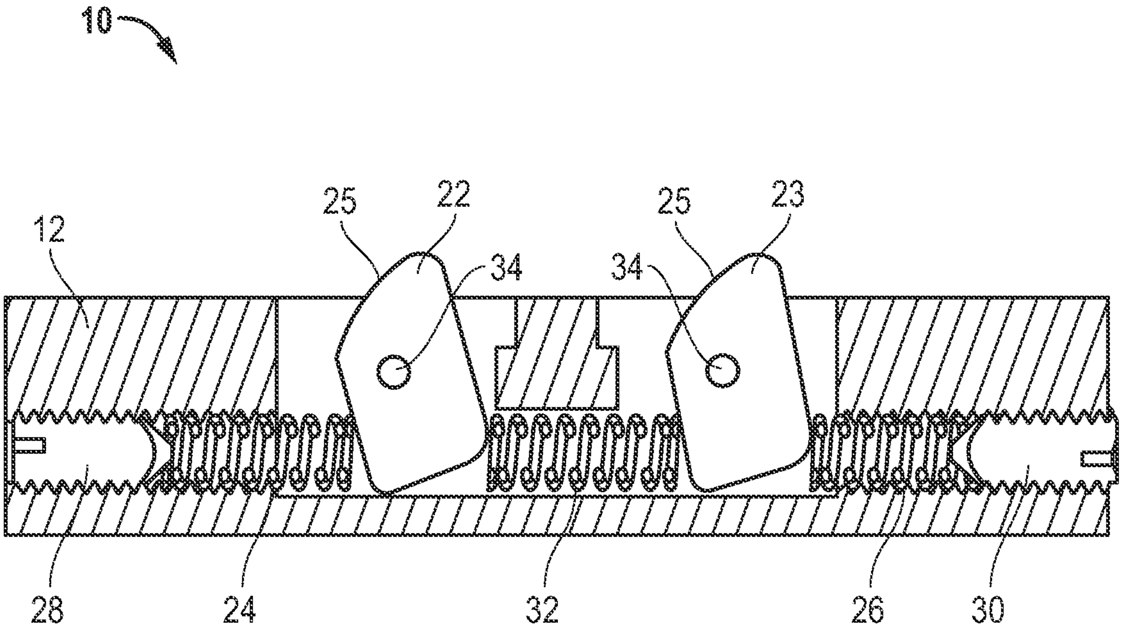
FIG. 3 is a side cut away view of the invention of FIG. 1.
Figure 4:
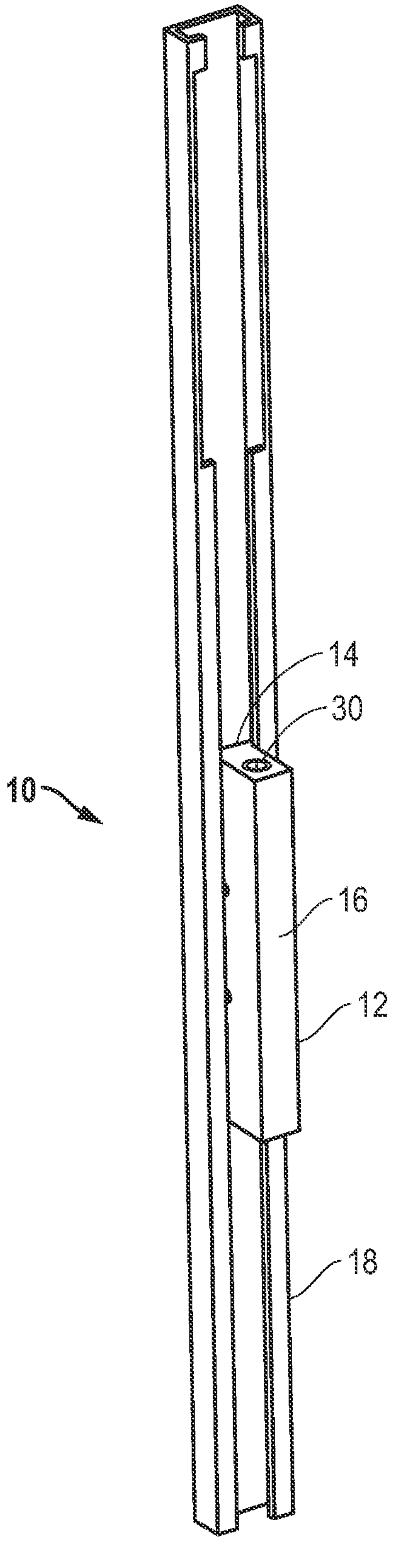
FIG. 4 is a schematic view showing the "T" shaped first face of the invention of FIG. 1 engaged with a window frame.

As shown in FIG. 2, first pressure delivery device 24 is located within the main body 12 and is connected with spacer 22. A second pressure delivery device 26 is located within the main body 12 and connects with the spacer 22, with the spacer 22 in between the first pressure delivery device 24 and the second delivery device 26. FIGS. 2 and 3 show a preferred embodiment where there is a center pressure delivery device 32 between a first spacer 22 and a second spacer 23. However, without center pressure delivery device 32 and with only one spacer, spacer 22 for example, the first pressure delivery device 24 is on one side of spacer 22 and the second pressure delivery device 26 is on the other side of spacer 22 directly opposite.

Pressure delivery devices 24, 26 and 32 may be any type of pressure delivery devices now known or hereafter developed such as springs as shown, for example only and not by limitation.

A first pressure adjustment device 28 and a second pressure adjustment device 30 are provided where the first pressure adjustment device 28 is configured to adjustably contact the first pressure delivery device 24 so as to add or subtract pressure on the at least one spacer 22 from one side of the at least one spacer 22. A second pressure adjustment device 30 is provided where the second pressure adjustment device 30 is configured to adjustably contact the second pressure delivery device 26 so as to add or subtract pressure on the at least one spacer 22, or 23 when present, from another side as illustrated.

Pressure adjustment devices 28 and 30 may be any type of pressure adjustment devices now known or hereafter developed such as set screws as shown, for example only and not by limitation.

Again, preferably, as shown, there are two spacers 22 and 23 and a center pressure delivery device 32 is located within the main body 12 and between the first spacer 22 and the second spacer 23. In this embodiment as shown, a first pressure delivery device 24 is located on one side the first spacer 22, the first pressure delivery device 24 opposite the center pressure delivery device 32 with the first spacer 22 in between. Second pressure delivery device 26 is located on one side of the second spacer 23, the second pressure delivery device 26 opposite the center pressure delivery device 32 with the second spacer 23 in between as shown. Applicants have found that the center pressure delivery device 32 modulates and transfers pressure adjustments between the first spacer 22 and the second spacer 23 such that pressure on the window frame 18 is spread between the two spacers for more effective contact with the window frame 18.

FIGS. 1-3 also illustrate spacer pin 34 which is used to movably connect spacers 22 and 23 within main body 12 as shown.

Referring now to FIGS. 4, 5 and 6, again, in one aspect, the main body 12 is "T" shaped. Applicants have found the "T" shape is useful but is not presented herein by limitation but for example only since other shapes are easily substituted that could accomplish the same connection objective. As shown the "T" shape of main body 12 is formed with a first face 14 overlapping a second face 16 where the first face 14 is configured to movably fit within a window frame 18 such that the main body 12 is movably connected with the window frame 18. The second face 16 is configured to engage a window sash 20. In operation, once window balance 10, main body 12, first face 14 is slipped into window frame 18, spacer 22, and 23 when present, engages window frame 18, not shown for clarity. Window balance 10 main body 12 engagement pressure of the spacer 22 with window frame 18 is adjusted by use of pressure adjustment devices 28 and 30 to match the weight of window sash 20. That is, if the window sash 20 is not very heavy, pressure on spacers 22 and 23 can be small whereas if the window sash 20 is heavy, pressure on spacers 22 and 23 can be adjusted accordingly such that wherever the window sash 20 is located it will remain.

Figure 5:
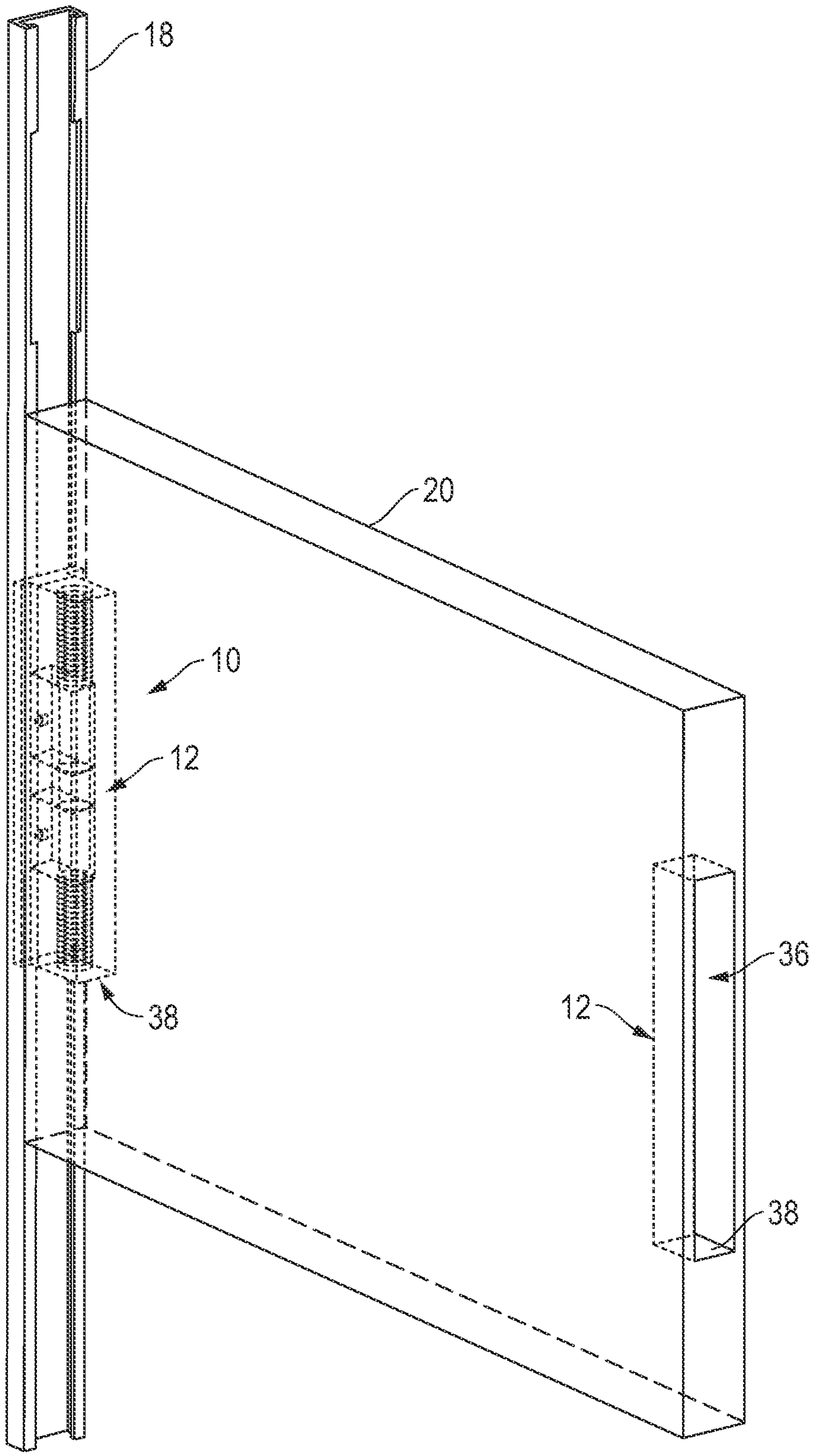
FIG. 5 is a schematic view of the invention of FIG. 4 showing a window sash being lowered over the window balance of the invention of FIG. 1.
Figure 6:
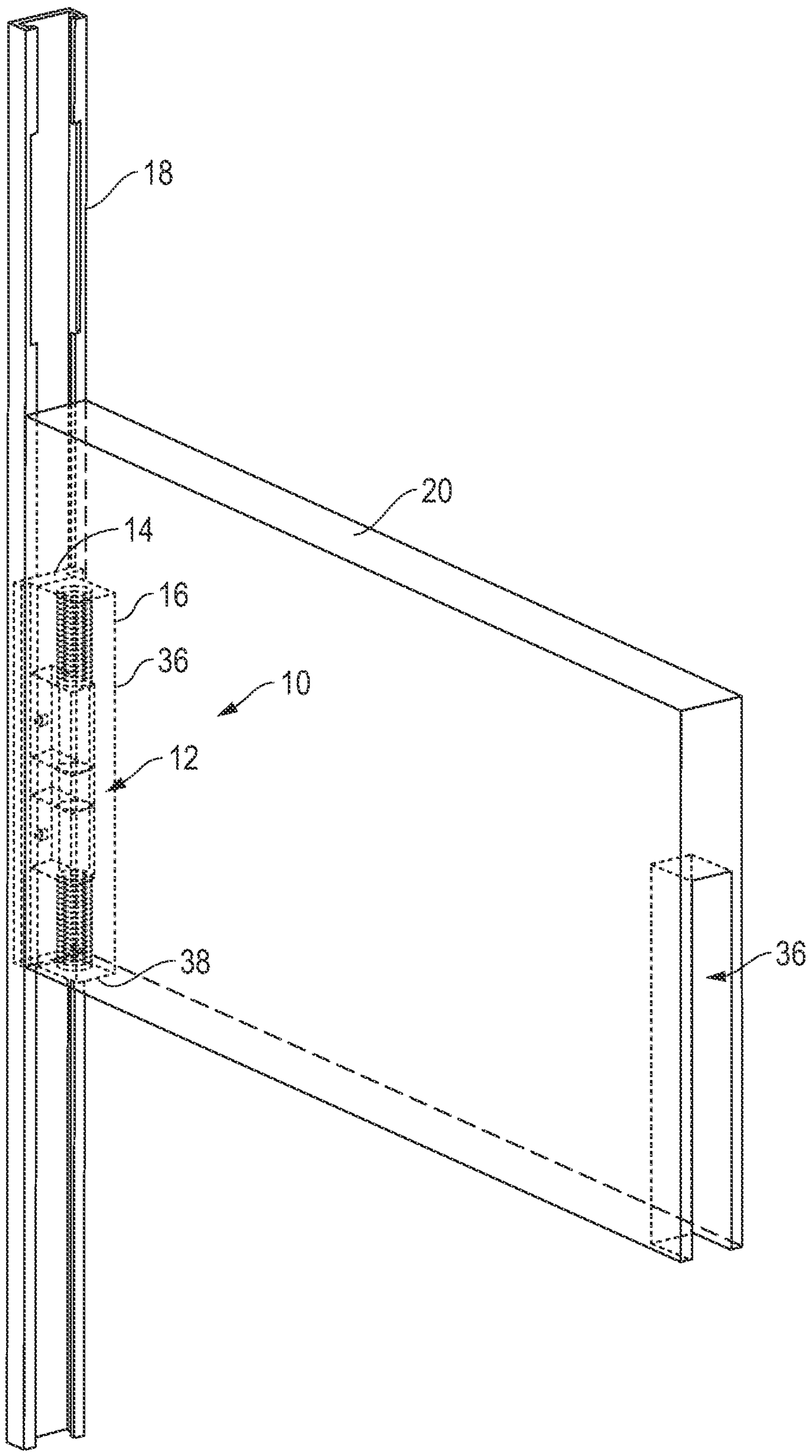
FIG. 6 shows the invention of FIGS. 4 and 5 with the window balance of the invention of FIG. 1, contained within a cutout of the window sash and held in place by a window sash capture clip.

Referring now to FIGS. 5 and 6, window sash 20 includes, for example only and not by limitation, a cut out 36 configured to accommodate the window balance 10, main body 12, second face 16. Once second face 16 of the main body 12 is in place within cut out 36 of the window sash 20 the connection with window balance 10 main body 12 is maintained by window sash capture clip 38. Window sash capture clip 38, for example only and not by limitation, is a device configured to engage the main body 12 by connecting to and sealing the end of the cut out 36 so as to connect the window sash 20 with the main body 12 when the main body 12 is connected with the window frame 18.

Once secured in place, movement of the window sash 20 results in movement of window balance 10, main body 12, first face 14 within window frame 18. Once movement is stopped, window sash 20 is held in place by pressure of spacer 22, and 23 when present, on window frame 18 and the connection of the window sash 20 with the main body 12 as described. No complex combination of coiled springs extending and retracting is required, repair and replacement is greatly simplified and costs are reduced.

As should be understood, more than one main body 12 may be used where desired. Window frame 18 has two sides and one main body 12 may be connected with window frame 18 on one side and another main body 12 connected with the window frame 18 on the other side. Connection of window sash 20 with both main bodies 12 ensures that even very heavy window sashes 20 may be easily supported at desired locations along the window frame 18.

The description of the present embodiments of the invention has been presented for purposes of illustration, but is not intended to be exhaustive or to limit the invention to the form disclosed. Many modifications and variations will be apparent to those of ordinary skill in the art. As such, while the present invention has been disclosed in connection with an embodiment thereof, it should be understood that other embodiments may fall within the spirit and scope of the invention as defined by the following claims.

The invention claimed is:

1. A window balance apparatus comprising:
   - a. a main body configured to movably connect with a window frame and to connect with a window sash;
   - b. a first spacer and a second spacer connected with said main body, the first spacer and second spacer configured to extend from the main body when connected to said main body;
   - c. a center pressure delivery device located within said main body and between said first spacer and said second spacer; and
   - d. a first pressure delivery device located on one side of said first spacer, said first delivery device opposite said center pressure delivery device with said first spacer in between and a second pressure delivery device located on one side of said second spacer, said second pressure delivery device opposite said center pressure delivery device with said second spacer in between.

2. The apparatus of claim 1 wherein the center pressure delivery device, the first pressure delivery device and the second pressure delivery device is a spring.

3. The apparatus of claim 1 further including a first pressure adjustment device and a second pressure adjustment device wherein said first pressure adjustment device is configured to adjustably contact said first pressure delivery device so as to add or subtract pressure on said first spacer and a second pressure adjustment device wherein said second pressure adjustment device is configured to adjustably contact said second pressure delivery device so as to add or subtract pressure on said second spacer.

4. The apparatus of claim 3 wherein the first pressure adjustment device and the second pressure adjustment device is a set screw.

5. The apparatus of claim 1 wherein the main body is F shaped is a T-shaped cross-section with a first face overlapping a second face wherein said first face is configured to movably fit within said window frame such that the main body is movably connected with the window frame and such that the second face is configured to engage said window sash.

6. The apparatus of claim 1 further including a window sash capture clip configured to engage the main body so as to connect the window sash with the main body when the main body is movably connected with the window frame.

7. The apparatus of claim 1 wherein the first spacer and the second spacer include a contact face wherein the contact face angles away from the main body such that more of the contact face contacts the window frame as pressure is added to the spacers and less of the contact face contacts the window frame as pressure is subtracted from the spacers.

8. The apparatus of claim 1 further including a window frame with a first side and a second side and a first main body and a second main body, with the first main body movably c with the first side of the window frame and with the second main body movably connected with the second side of the window frame and said window sash connected with both the first main body ad the second main body.

9. A window balance method comprising:

a. providing a main body confirmed to movably connect with a window frame and to connect with a window sash; a first spacer and a second spacer connected with said main body, the first spacer and second spacer configured to extend from the main body when connected to said main body; a center pressure delivery device located within said main body and between said first spacer and said second spacer and a first pressure delivery device located on one side of said spacer, said first pressure delivery device opposite said center pressure delivery device with said first spacer in between and a second pressure delivery device located on one side of said second spacer, said second pressure delivery device opposite said center pressure delivery device with said second spacer in between; and b. adjusting said first and second pressure delivery devices so as to apply selected pressure to said first and second spacers.

10. The method of claim 9 wherein the main body is a T-shaped cross-section with a first face overlapping a second face wherein said first face is configured to movably fit within said window frame such that the main body is movably connected with the window frame and such that the second face is configured to engage said window sash.

11. The method of claim 9 further including a window sash capture clip configured to engage the main body so as to connect the window sash with the main body when the main body is movably connected with the window frame.

12. The method of claim 9 wherein the pressure delivery device is a spring.

13. The method of claim 9 further including a first pressure adjustment device and a second pressure adjustment device wherein said first pressure adjustment device is configured to adjustably contact said first pressure delivery device so as to add or subtract pressure on said first spacer and a second pressure adjustment device wherein said second pressure adjustment device is configured to adjustably contact said second pressure delivery device so as to add or subtract pressure on said second spacer.

14. The method of claim 13 wherein the first pressure adjustment device and the second pressure adjustment device is a set screw.

15. The method of claim 9 wherein the first spacer and the second spacer include a contact face wherein the contact face angles away from the main body such that more of the contact fac contacts the window frame as pressure is added to the spacers and less of the contact face contacts the window frame as pressure is subtracted from the spacers.

16. The method of claim 9 further including a window frame with a first side and a second side and a first main body and a second main body, with the first main body movably connected with the first side of the window frame and with the second main body movably connected with the second side of the window frame and said window sash connected with both the first main body and the second main body.

* * * * *